United States Patent
Hall et al.

(10) Patent No.: US 8,339,006 B2
(45) Date of Patent: Dec. 25, 2012

(54) PERMANENT MAGNET ARRANGEMENT FOR GENERATOR ROTOR

(75) Inventors: Vincent Hall, Elk Mound, WI (US); Stephen G. Crain, Hudson, WI (US)

(73) Assignee: McMillan Electric Company, Woodville, WI (US)

( * ) Notice: Subject to any disclaimer, the term of this patent is extended or adjusted under 35 U.S.C. 154(b) by 381 days.

(21) Appl. No.: 12/698,546

(22) Filed: Feb. 2, 2010

(65) Prior Publication Data

US 2010/0133942 A1 Jun. 3, 2010

Related U.S. Application Data

(60) Provisional application No. 61/235,427, filed on Aug. 20, 2009.

(51) Int. Cl.
*H02K 1/00* (2006.01)
(52) U.S. Cl. ...................... 310/181; 310/261.1
(58) Field of Classification Search .................. 310/181, 310/156.01–156.84, 261.1
See application file for complete search history.

(56) References Cited

U.S. PATENT DOCUMENTS

| | | | |
|---|---|---|---|
| 1,311,542 A | 7/1919 | Turbayne | |
| 2,540,202 A | 2/1951 | Haas | |
| 2,689,327 A | 9/1954 | Haas | |
| 3,233,135 A | 2/1966 | Holzer | |
| 3,346,749 A | 10/1967 | Shafranek | |
| 3,366,869 A | 1/1968 | Young | |
| 3,517,237 A | 6/1970 | Lloyd | |
| 4,055,789 A * | 10/1977 | Lasater | 320/124 |
| 4,309,635 A | 1/1982 | Sei | |
| 4,717,850 A | 1/1988 | Muller | |
| 5,030,867 A * | 7/1991 | Yamada et al. | 310/156.25 |
| 5,132,581 A * | 7/1992 | Kusase | 310/263 |
| 8,198,872 B2 * | 6/2012 | Xu et al. | 322/59 |
| 2003/0102756 A1* | 6/2003 | Kusase | 310/156.53 |

* cited by examiner

*Primary Examiner* — Thanh Lam
(74) *Attorney, Agent, or Firm* — Merchant & Gould P.C.

(57) ABSTRACT

An electric generator rotor having one or more permanent magnets coupled thereon. The permanent magnets provide a constant magnetic field in the rotor at all times, therein minimizing the effect of rotor residual magnetism on the start-up characteristics of the electric generator. The type and placement of the one or more permanent magnets on the rotor and/or magnetic field confinement techniques may be utilized to control spatial distribution of magnetic field within the rotor.

9 Claims, 7 Drawing Sheets

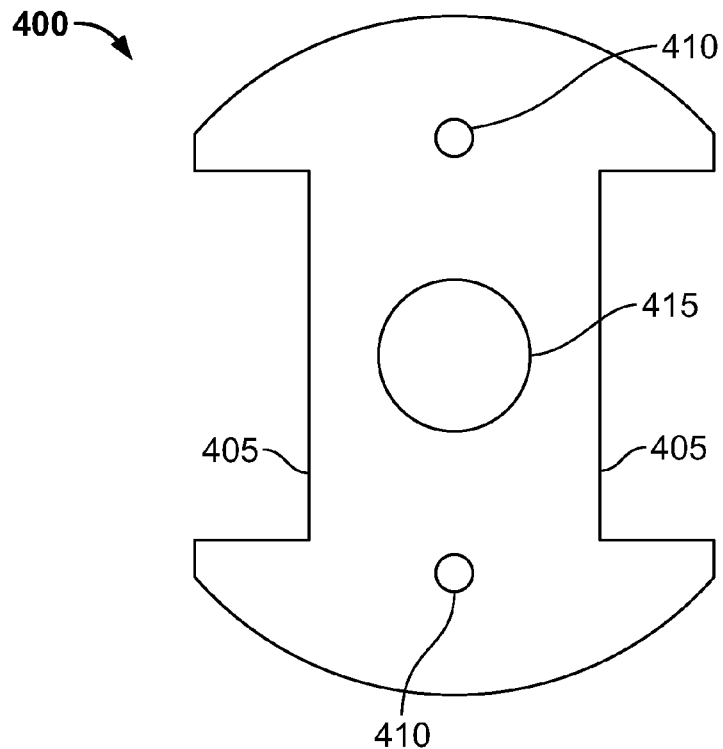
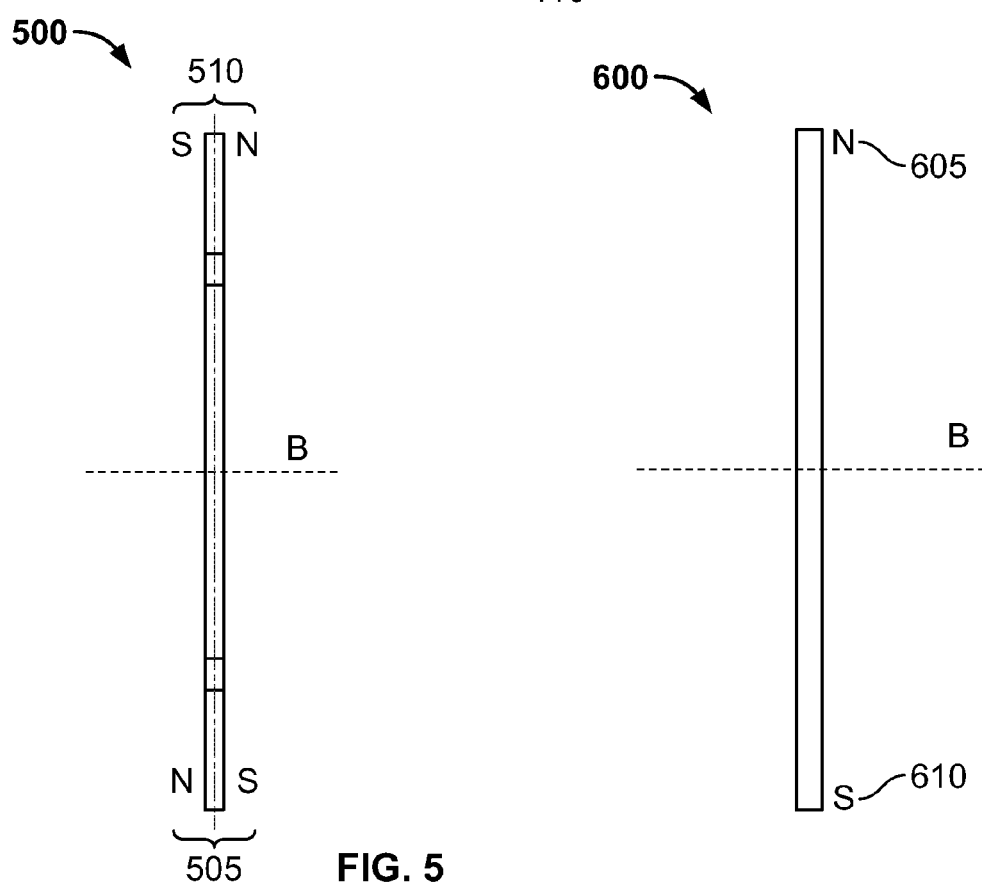
FIG. 4
FIG. 5
FIG. 6

PERMANENT MAGNET ARRANGEMENT FOR GENERATOR ROTOR

RELATED APPLICATION

This application claims the benefit of U.S. patent application Ser. No. 61/235,427 filed on Aug. 20, 2009, the entirety of which is hereby incorporated by reference.

BACKGROUND

An electric generator transforms mechanical energy into electrical energy. In general, an electric generator includes a rotatable rotor positioned within a stationary stator. Rotor windings are energized to generate a magnetic field. Upon actuation of the rotor, the rotating magnetic field is coupled into stator windings positioned on the stator. In this manner, an electromotive force (EMF) is induced in the stator windings such that the electric generator may supply rated voltage and power to a load.

Typically, the rotor includes a magnetic core material constructed from a grade of electrical steel that retains a fraction of the magnetic field or flux when the generator is turned off. This residual magnetism influences generator operation under start-up conditions. However, the magnitude of residual magnetism retained by the rotor is degenerative, therein potentially effecting start-up characteristics of the electric generator.

DESCRIPTION OF THE DRAWINGS

Aspects of the disclosure may be more completely understood in consideration of the following detailed description of various embodiments of the disclosure in connection with the accompanying drawings, in which:

FIG. 4 is a top view of an example permanent magnet;

FIG. 5 is an end view of a permanent magnet having an example magnetization;

FIG. 6 is an end view of a permanent magnet having an alternate example magnetization;

DETAILED DESCRIPTION

The example embodiments described in the following disclosure are provided by way of illustration only and should not be construed as limiting. Various modifications and changes may be made to the example embodiments described below without departing from the true spirit and scope of the disclosure.

The present disclosure relates to an electric generator rotor having one or more permanent magnets coupled thereon. In the example embodiments provided herein, the permanent magnets provide a constant magnetic field in the rotor, therein minimizing the effect of rotor residual magnetism on the start-up characteristics of the electric generator. Further, the type and placement of the one or more permanent magnets on the rotor and/or magnetic field confinement techniques may be utilized to control spatial distribution of magnetic field within the rotor as desired.

Figure 1:
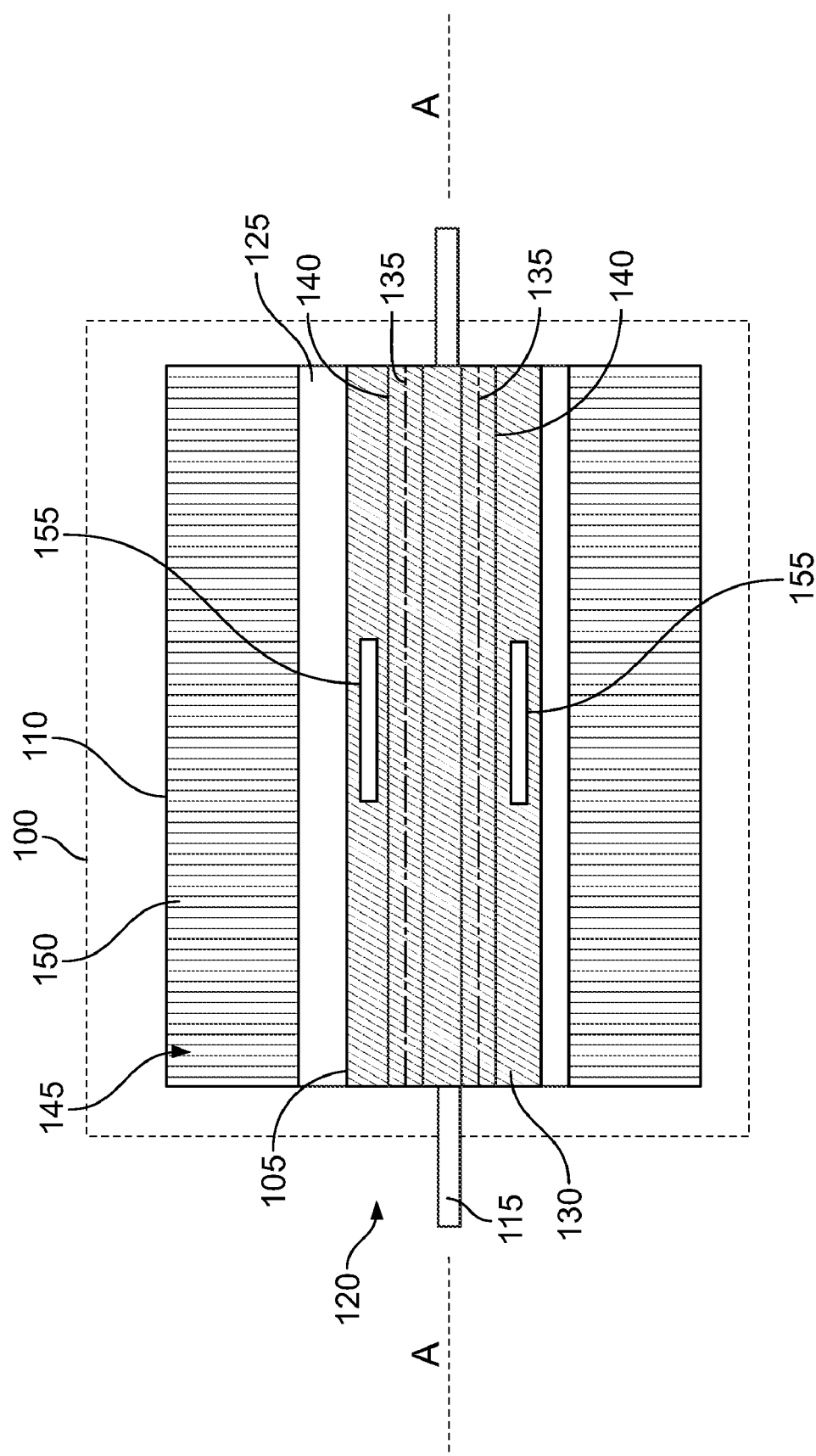
FIG. 1 is an example electric generator shown in a partial cross-sectional view.

Referring now to FIG. 1, a simplified example electric generator 100 is shown in a partial cross-section. The generator 100 transforms mechanical rotational energy into electricity via electromagnetic induction. Potential applications for the generator 100 range broadly from the large-scale, such as electric utility power generation, to the small-scale, such as an auxiliary power unit (APU).

In the example embodiment, the generator 100 includes a rotor 105, a stator 110, and a shaft 115. The rotor 105 is positioned with a central passage 120 of the stator 110. An air gap 125 allows the rotor 105 to rotate unimpeded within the central passage 120 along a main rotor axis A. In general, the rotor 105 includes a rotor core 130 formed from a magnetic material. A plurality of rotor windings 135, each comprising a plurality of electrical conductors, is wound within rotor winding slots 140. The stator 110 generally includes a stator core 145 constructed from a plurality of high permeability slotted laminations 150. A plurality of stator windings (not shown), each comprising a plurality of electrical conductors, are wound within stator winding slots (not shown). A prime mover, such as a diesel combustion engine, is coupled to the shaft 115 for the transfer of torque thereto. Other embodiments of the example generator 100 are possible as well.

In operation, the rotor windings 135 are energized with an electric current to produce a magnetic field and the rotor 105 is driven such that a rotating magnetic field is coupled into the stator windings to induce an electric current. The induced current may be conditioned as desired such that a rated operational voltage is supplied to a load. In a typical small-scale application, 12V DC and/or 120V AC at 60 Hz may be provided at an output terminal of the generator 100 such that various DC and/or AC electrical devices may be operated. For example, an APU for an over-the-road tractor trailer may require DC voltage to run on-board truck accessories such as dome lights, CB radios, and other DC voltage accessories. Further, in the example provided, AC voltage may be required to power an air conditioner, refrigerator, television, and other accessories requiring AC voltage.

The respective components of the generator 100 (i.e., the rotor 105, stator 110, rotor windings 135, air gap 125, and others) form a magnetic circuit configured to at least optimize the coupling of the rotor magnetic field into the stator windings. In this regard, each of the respective components governs the efficiency and operation of the generator 100. For example, in one aspect, the rotor 105 is a particularly important component for the operation of the generator 100 under start-up operating conditions. In general, the rotor 105 includes a magnetic core material constructed from a grade of electrical steel that retains a fraction of magnetic field when the generator 100 is turned off. This residual magnetism influences operation of the generator 100 under start-up conditions. However, the magnitude of residual magnetism is degenerative over the lifetime of the rotor 105 and thus the start-up characteristics of the generator 100 can be negatively impacted.

One or more of permanent magnets 155 are coupled to a portion of the rotor 105 to augment and/or replace residual magnetism of the rotor 105. In general, the permanent magnets 155 as described in the present disclosure can be any type or variation of permanent magnet material such as ferrite materials, alnico, and other rare earth type materials that may be otherwise isotropic or anisotropic. These magnets could be produced in a sintering process (ceramic) or a molded or extruded process (flexible).

Figure 2:
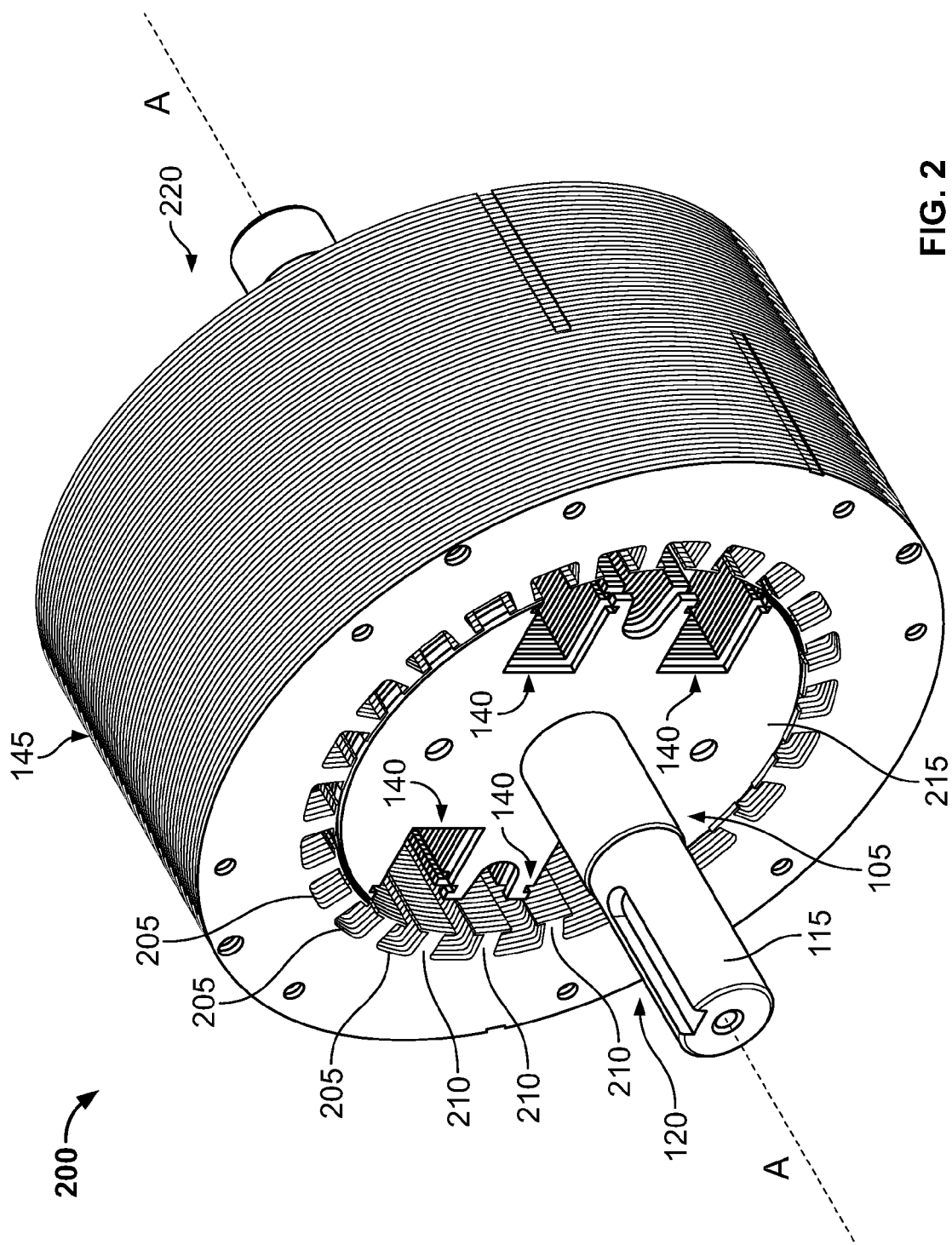
FIG. 2 is an isometric view of a rotor/stator assembly including a rotor positioned within a stator core.

Referring now to FIG. 2, an isometric view of a rotor/stator assembly 200 of the example generator 100 described above with reference to FIG. 1 is shown. The rotor 105 is positioned within central passage 120 of the stator core 145. The stator core 145 includes a plurality of stator slots 205 circumferentially positioned at a pre-defined pitch on an inner surface defined by the central passage 120. In practice, a plurality of electrical conductors are positioned lengthwise within the stator slots 205 and are subsequently wrapped around a respective stator pole 210 to form a stator winding, as mentioned above. The shaft 115 (as shown in FIG. 1) is shown extending from a first end 215 that is opposite of a second end 220 of the rotor 105. Additionally shown are rotor winding slots 140 in which rotor windings are fitted therein.

Figure 3:
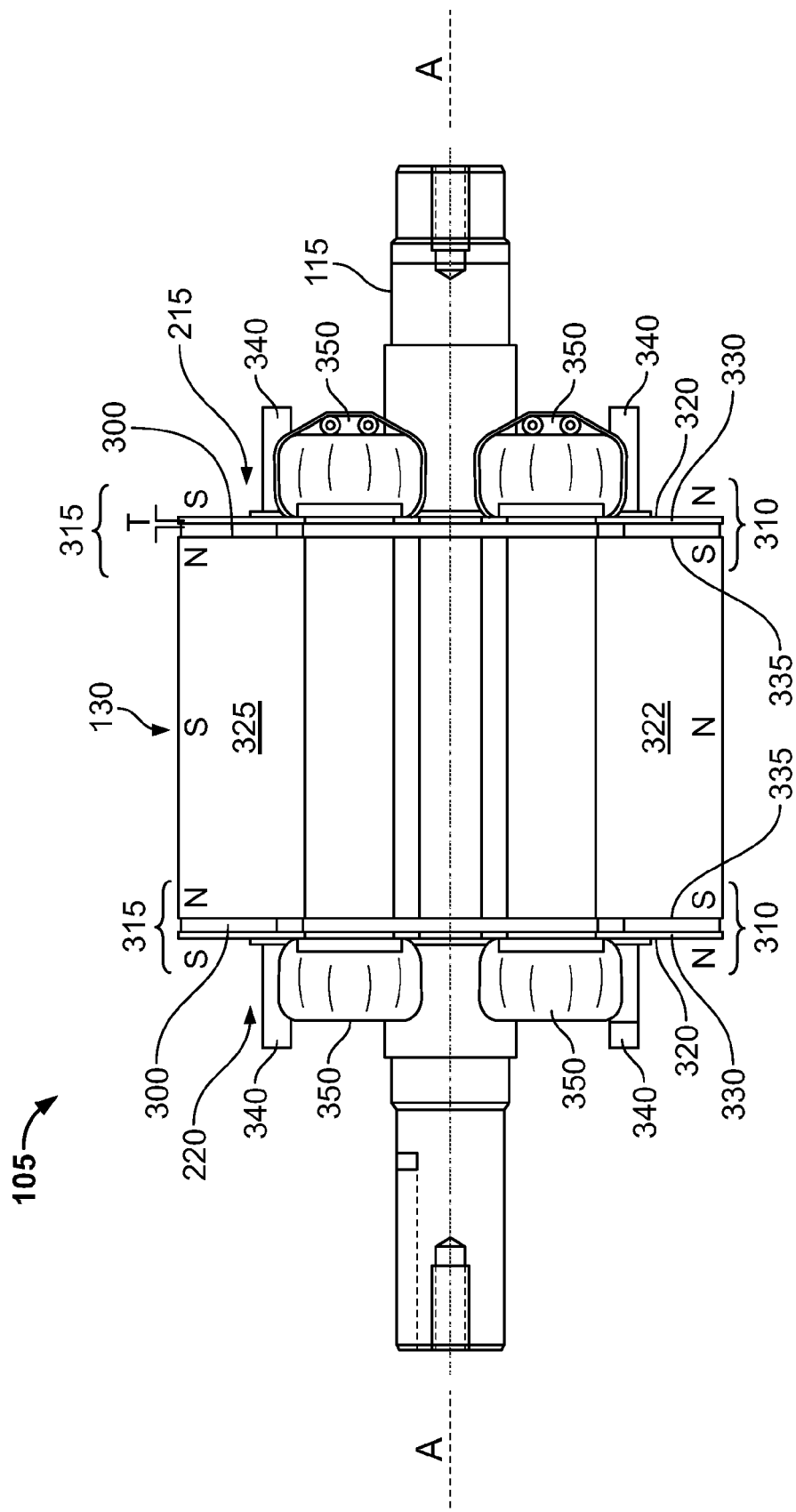
FIG. 3 is a side view of the rotor as shown in FIG. 2 having one example permanent magnet arrangement.

Referring now to FIG. 3, a side view of the rotor 105 of FIG. 2 is shown in which a permanent magnet 300 is coupled to both the first end 215 and a second end 220 of the rotor 105. Other embodiments are possible as well. For example, a permanent magnet 300 can generally be coupled to either one or both of the first end 215 and the second end 220. The permanent magnet 300 is similar to the one or more permanent magnets 155 described above with respect to FIG. 1.

In the example embodiment, the permanent magnet 300 is magnetized to include a first complementary north and south pole 310 (FCP), and a second complementary magnetic north and south pole 315 (SCP). The respective magnetic poles of the FCP 310 and the SCP 315 of the permanent magnet 300 are asymmetric with respect to the main rotor axis A. In the example embodiment, the permanent magnet 300 coupled to the first end 215 and the permanent magnet 300 coupled to the second end 220 of the rotor 105 are arranged such that the FCP 310 of each respective permanent magnet 300 is positioned in a first hemisphere 322 of the rotor 105, as defined with respect to the main rotor axis A, and the respective SCP 315 is positioned in a second hemisphere 325 of the rotor 105. In the example embodiment, the first hemisphere 322 is a north pole and the second hemisphere 325 is a south pole, thereby complementing the polarity of the SCP 310 and FCP 315, respectively. Other embodiments are possible as well.

A lamination stack 320 comprising one or more high permeability magnetic laminations, having a total thickness, T, is coupled on a first side 330 of each respective permanent magnet 300. The first side is opposite of a second side 335 of each respective permanent magnet 300 that is in contact with the rotor 105. A plurality of pinions 340 registers each permanent magnet 300 and respective lamination stack 320 to the rotor 105 via complementary pinion apertures formed within both the permanent magnet 300 and the one or more magnetic laminations that form the lamination stack 320.

Further shown in FIG. 3 is a rotor core 130 that supports a plurality of rotor windings 350. Conventionally, the rotor core 130 serves as a source of residual magnetism by virtue of being formed from a particular grade of electrical steel, as described above. However, in the example embodiment, the rotor core 130 may be manufactured from a grade of magnetic steel that is not explicitly chosen to provide optimal residual magnetism.

Referring now to FIG. 4, a top view of a permanent magnet 400 is shown according to the principles of the present disclosure. The permanent magnet 400 is similar to the permanent magnet 300 as described above with respect to FIG. 3. In general, the shape of the permanent magnet 400 is formed to be complementary to the shape of the first end 215 and second end 220 of the rotor 105. In one embodiment, the permanent magnet 400 is formed as a molded or extruded flexible magnet that is stamped into shape. However, other embodiments are possible as well.

In the example embodiment, the permanent magnet 400 is generally a single body that is circular having a pair of notches 405 symmetrically formed thereon. Further, defined within the body of the permanent magnet 400 are a plurality of circular pinion apertures 410 and a main aperture 415. Each respective pinion aperture 410 is sized such that a pinion 340 may be inserted therethrough, as described above. Further, the main aperture 415 is sized such that shaft 115 may be inserted therethrough, as described above.

Referring now to FIGS. 5 and 6, a side-on view of permanent magnets having different magnetizations are shown according to the principles of the present disclosure. In FIG. 5, a permanent magnet 500 magnetized as a two-pole magnet is shown. The permanent magnet 500 includes a first complementary north and south pole 505 (FCP) and a second complementary magnetic north and south pole 510 (SCP). The respective magnetic north and south poles of the FCP 505 and the SCP 510 are asymmetric with respect to a longitudinal axis B that is coincident with main rotor axis A. In this manner, magnetic field lines emanating from the respective north pole surface of the FCP 505 and the SCP 510 are initially in parallel with a longitudinal axis B.

In example embodiments, the permanent magnet 500 is magnetized similar to the permanent magnet 300 as described above with reference to FIG. 3, and further has dimensions similar to the permanent magnet 400 as described above with reference to FIG. 4. Additionally, in one example embodiment, the FCP 505 and the SCP 510 each comprise approximately 50% of the volume of the permanent magnet 500. Other embodiments of permanent magnet 500 are possible as well.

In FIG. 6, a permanent magnet 600 magnetized as a single-pole magnet is shown. In the example embodiment, the permanent magnet 600 includes a north pole 605 and complementary south pole 610. In contrast to permanent magnet 600 as described with reference to FIG. 6, magnetic field lines as emanating from north pole 605 are initially perpendicular to longitudinal axis B. In example embodiments, the permanent magnet 600 has dimensions similar to the permanent magnet 400 as described above with reference to FIG. 4. Additionally, in one example embodiment, the north pole 605 and the south pole 610 each comprise approximately 50% of the volume of the permanent magnet 600. Other embodiments of permanent magnet 600 are possible as well.

In general, the permanent magnets as described with reference to FIGS. 5 and 6 may be magnetized as having one or more complementary magnetic pole pairs. Additionally, as alluded to above, each of the respective permanent magnets of FIGS. 5 and 6 may be formed from any magnetic material as desired. For example, in one embodiment, the magnetic portion of the respective permanent magnets 500 and 600 may be formed from a 1H Nitride having a Br ranging from approximately 2400-2800 Gauss, an Hc ranging from approximately 2000-2400 Oersteds, an Hci ranging from approximately 2400-3200 Oerstads, a BHMax ranging from approximately 1.4-1.8 MGOe, and a functional operating temperature ranging from −40 C to 120 C. Other magnetic materials may be used as well.

Figure 7:
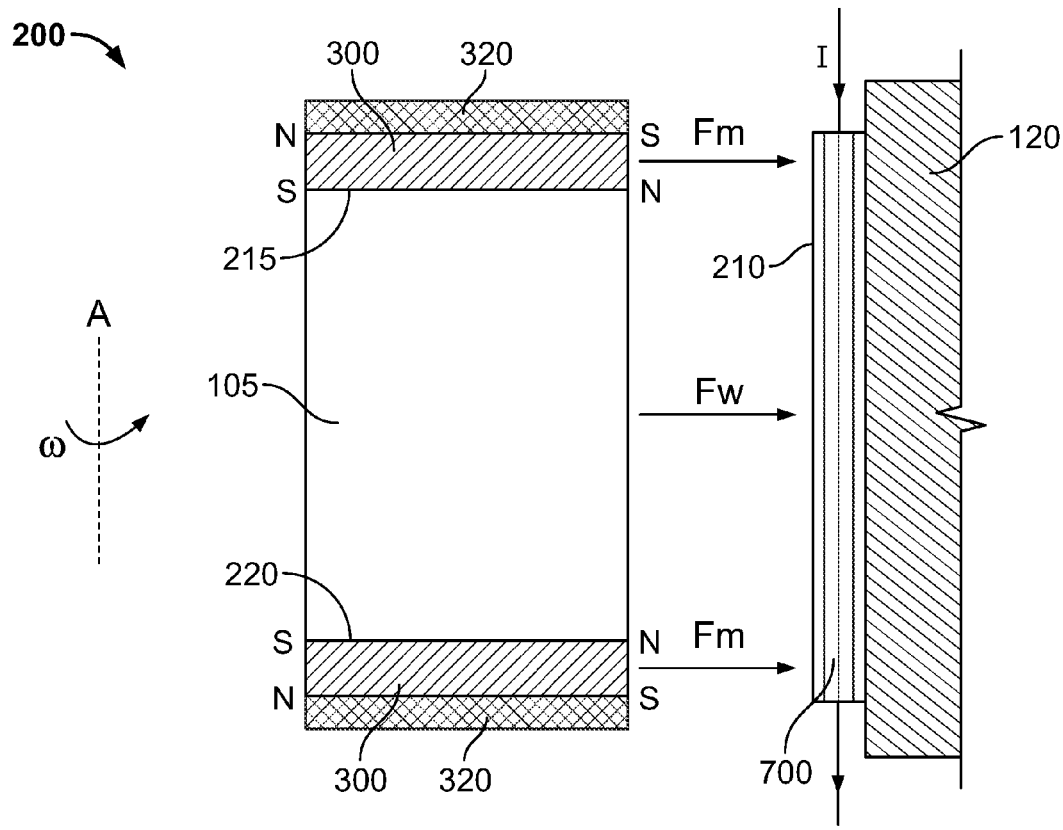
FIG. 7 is a cross sectional view of the rotor/stator assembly as shown in FIG. 2.

Referring now to FIG. 7, a simplified cross sectional view of the rotor/stator assembly 200 as depicted in FIG. 2 is shown. As described further below, a simplified magnetic field distribution is illustrated that includes a magnetic field component from an energized rotor winding and a magnetic field component from a pair of permanent magnets 300 coupled to the rotor 105. In the context of the present disclosure, the magnetic field component from the permanent magnets 300 effectively enhances and/or replaces a magnetic field component that would conventionally be contributed from a rotor core (or portions of the rotor core). In this manner, the permanent magnets 300 provide a constant magnetic field in the rotor at all times, therein minimizing the effect of rotor residual magnetism on the start-up characteristics of the example generator 100. Another benefit of the disclosed permanent magnet arrangement includes the possibility of using many different types of rotor core material that may be chosen to suit the application and conform to manufacturing costs and limitations.

In the example embodiment, the rotor 105 is provided with the permanent magnet arrangement and magnetization as described with reference to FIG. 3, in which a permanent magnet 300 is coupled to both the first end 215 and a second end 220 of the rotor 105. In this example, the rotor 105 is rotating at a rotational frequency, w, with respect to main rotor axis A. A simplified representation of a magnetic field component from energized rotor windings is embodied as a vector $F_w$, which characterizes a magnetic field flux magnitude and density that intersects a stator winding 700 wound around a stator pole 210 on the stator core 145. In a similar manner, a simplified magnetic field component contributed from each respective permanent magnet 300 is embodied as vector $F_m$, which characterizes a magnetic field flux magnitude and density that which intersects the stator winding 700 wound around the stator pole 210.

In idealized steady-state operation, the rotor windings are energized and the rotor 105 is driven at a rotational frequency, w, such that vectors, $F_w$ and $F_m$, intersect the stator winding 700 to induce an EMF. In turn, the induced EMF generates an AC current, I, in a direction consistent with the right hand rule. Thus, the total magnetic field contribution, $F_{total}$, in the idealized steady state can be written as $F_{total}=F_w+(F_m+F_m)$.

In the non-steady-state operating condition of electrical generator start-up, the rotor windings are not initially energized such that the magnetic field $F_w$ is not present. Thus, the rotor 105 may be rotating at angular frequency, w, however the total magnetic field contribution, $F_{total}$, would be written as $F_{total}=(F_m+F_m)$. According to the principles of the present disclosure, the magnetic field component, $F_m$, from each respective permanent magnet 300 is of sufficient magnitude to initially induce an EMF in the stator winding 700 prior to the rotor windings being energized. Therefore, the use of the permanent magnet arrangement of the present disclosure minimizes the effect and importance of rotor residual magnetism on the start-up characteristics of the generator 100.

In the example embodiment, the permanent magnets 300 further enable the generator 100 to begin delivering rated voltage and power to a load at reduced rotational frequencies. For example, without inclusion of the permanent magnets 300, a rotational frequency of 59 Hz may be required to initially induce an EMF in the stator winding 700. In contrast, with the disclosed permanent magnet arrangement, a rotational frequency of only 53 Hz may be required to initially induce an EMF in the stator winding 700.

Figure 8:
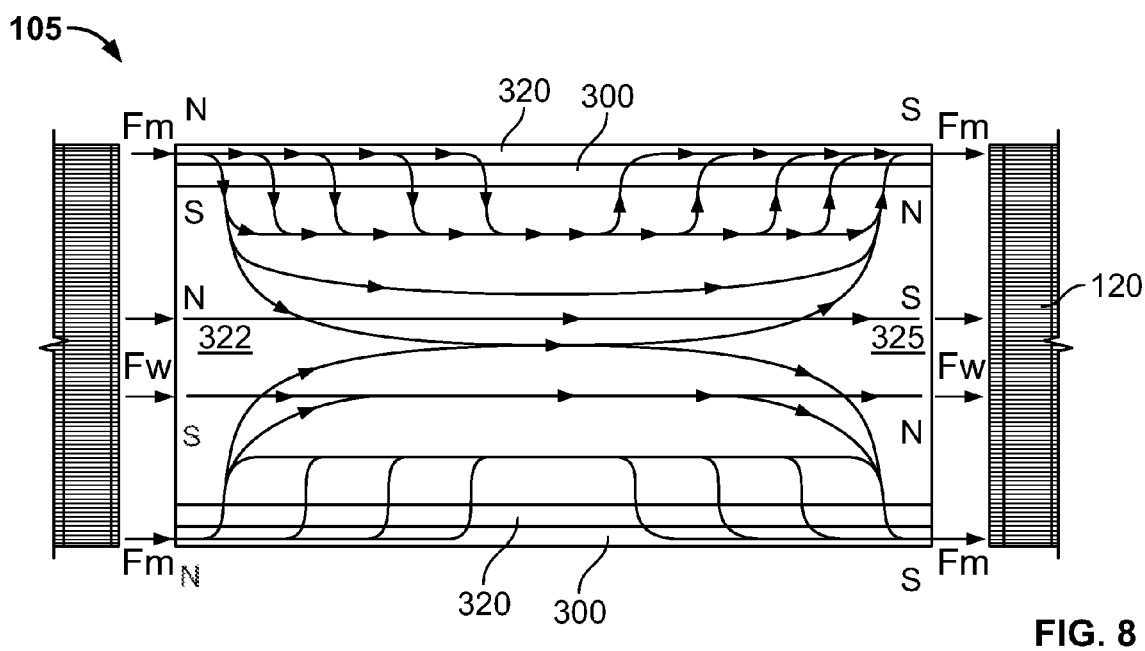
FIG. 8 is an enlarged view of the cross sectional view of the rotor/stator assembly as shown in FIG. 7.

Referring now to FIG. 8, the cross sectional view of the rotor/stator assembly 200 as of FIG. 7 is shown in an enlarged view to depict a simplified distribution of the magnetic field component $F_m$ within the rotor 105. In example embodiments, use of dual axially magnetized magnets 300 concentrates flux at each end of the rotor 105 because of opposing magnetic fields in the middle of the rotor 105. By using two magnets, the magnitude of the flux is maximized while minimizing the amount of materials needed to accomplish the same.

Additionally, the lamination stack 320 of a predefined thickness confines magnetic field lines of the permanent magnet 300 with the rotor 105. For example, in one embodiment, the lamination stack 320 is formed by 3 laminations each approximately 0.025 inches thick. However, other embodiments are possible as well.

Figure 9:
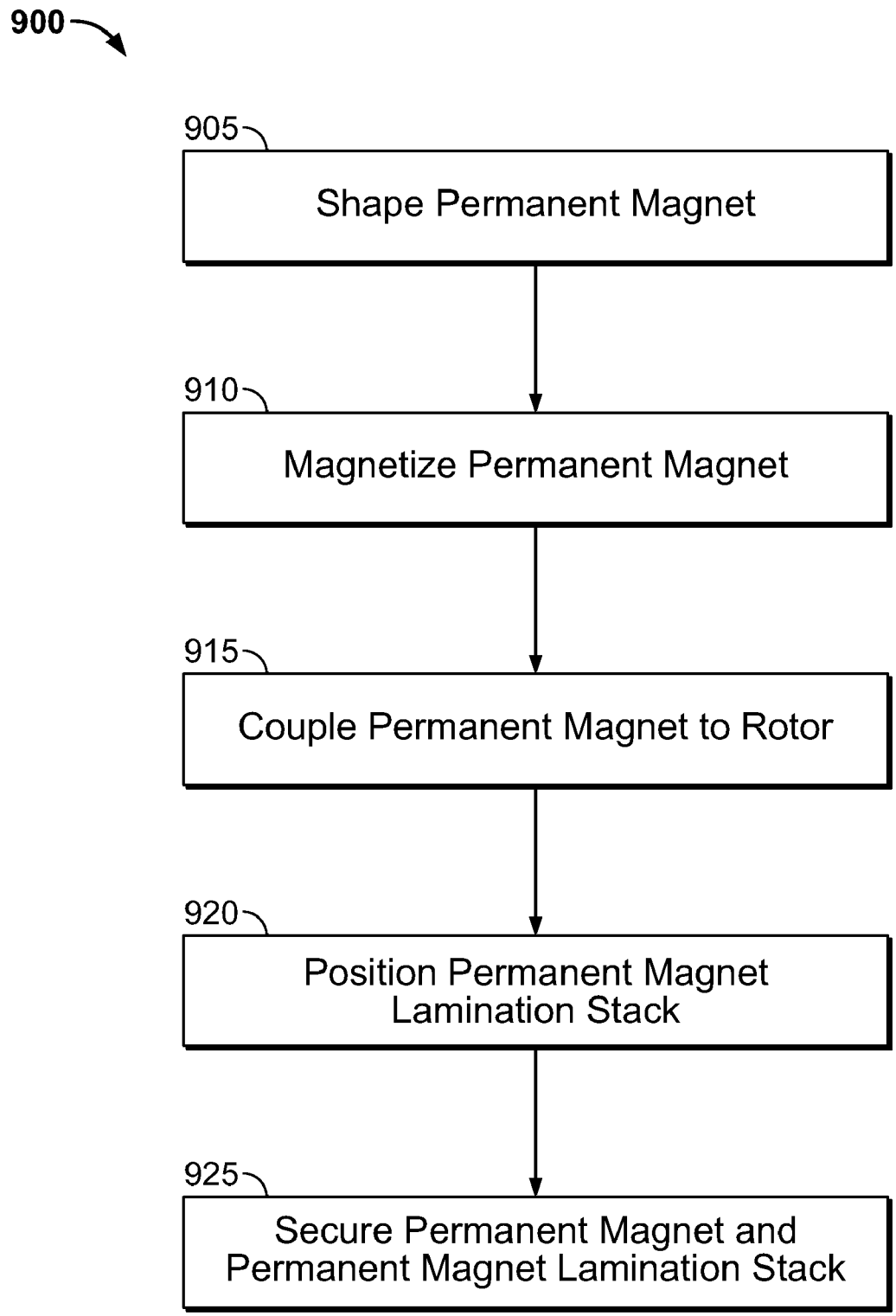
FIG. 9 is an example method for coupling one or more permanent magnets to an electric generator rotor.

Referring now to FIG. 9, an example method 900 for coupling one or more permanent magnets to an electric generator rotor in accordance with the principles of the present disclosure is described. Initially, at operation 905, one or more permanent magnets are shaped to complement the form of a respective physical feature of the rotor. In one example embodiment, a respective permanent magnet would be shaped to conform to the shape of an end of the rotor. Additionally, a respective permanent magnet may be shaped to include one or more apertures such that the permanent magnet may be secured to the rotor and/or accommodate for one or more features integrally formed with the rotor.

Next, at operation 910, the one or more permanent magnets are magnetized as desired. In general, a respective permanent magnet can include one or more pairs of complementary magnetic poles. Next, at operation 915, the one or more permanent magnets are coupled to the rotor. As described above, a respective permanent magnet for example may be coupled to an end of the rotor; however, other permanent magnet arrangements are possible as well. Further, the one or more pairs of complementary magnetic poles of the respective permanent magnet may be aligned generally parallel or perpendicular to a main rotor axis.

Next, at operation 920, a lamination stack is positioned on the permanent magnet. Next, at operation 925, the permanent magnet and lamination stack are secured to the rotor.

Figure 10:
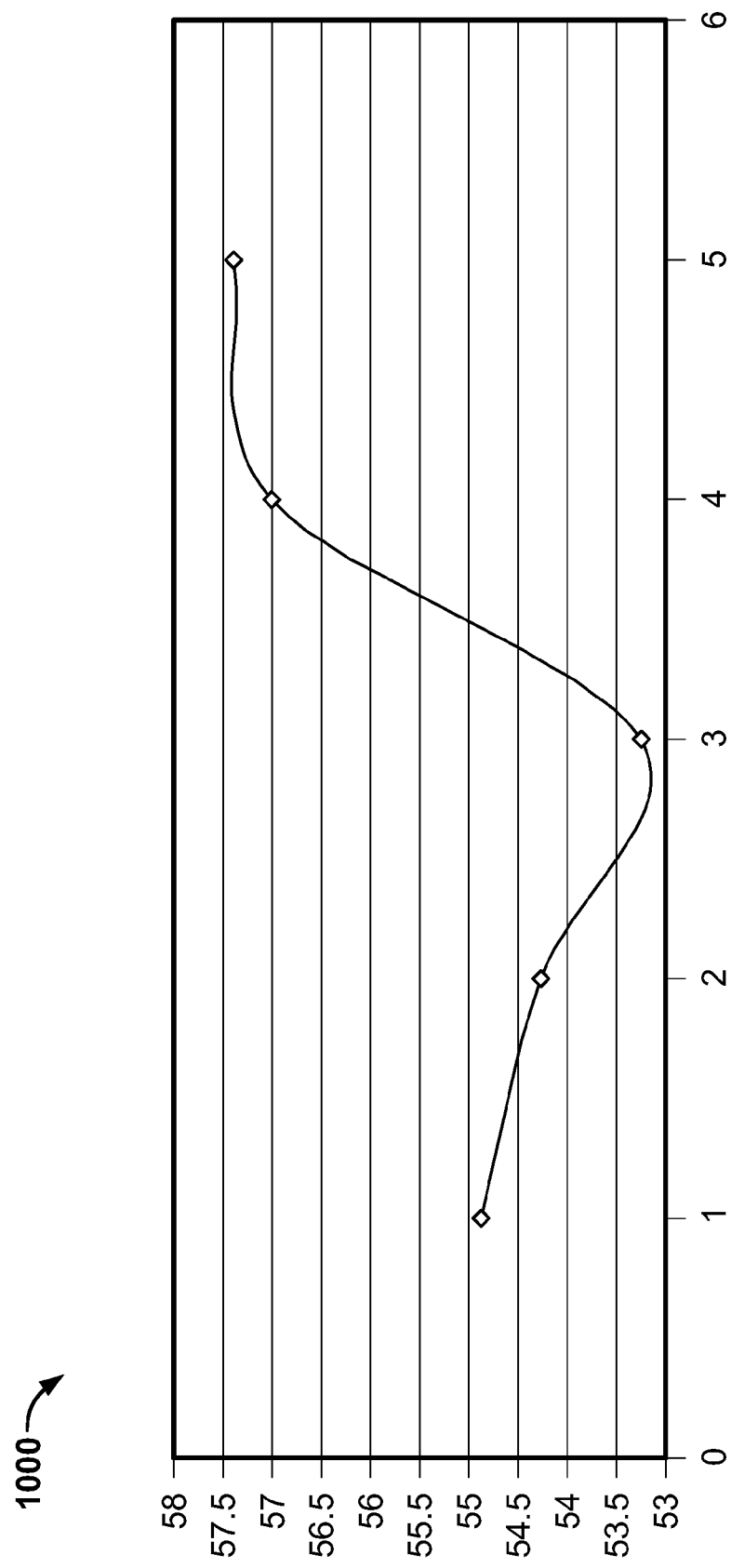
FIG. 10 is an example chart showing rotational frequencies of a rotor of an electric generator versus the number of laminations of a permanent magnet.

Referring now to FIG. 10, an example chart 1000 showing rotational frequency of a rotor of an electric generator versus the number of laminations of a permanent magnet. The rotational frequency (in Hertz) of the rotor is shown on the Y-axis versus the number of rotor laminations used to construct the lamination 3 on the X-axis. The chart 1000 was constructed with generator test data as recorded at McMillan Electric Company with a LeCroy Model 6030A Waverunner oscilloscope. The thickness of the laminations was 0.025 inches each. The start up frequency for each particular rotor sample was recorded by the oscilloscope as soon as it could accurately identify the frequency of the main winding voltage.

As illustrated by the chart 1000, the minimal rotational frequency needed to initially induce an EMF in the stator winding of the electric generator is achieved using a lamination stack (e.g., lamination stack 320) formed by 3 laminations. However, other embodiments are possible as well.

The preceding embodiments are intended to illustrate without limitation the utility and scope of the present disclosure. Those skilled in the art will readily recognize various modifications and changes that may be made to the embodiments described above without departing from the true spirit and scope of the disclosure.

What is claimed is:

1. An electric generator comprising:
   a stator core having a stator winding;
   a rotor having a rotor winding, the rotor being positioned within the stator core and being freely rotatable on a main rotor axis;
   a first permanent magnet having one or more first complementary magnetic poles coupled at a first end of the rotor; and a second permanent magnet having one or more second complementary magnetic poles coupled at a second end of the rotor;

wherein a permanent magnetic field is generated in the rotor from the first and second permanent magnets to induce an electromotive force in the stator winding upon rotation of the rotor; and wherein a minimum generation start frequency of the rotation of the rotor is 53 Hz.

2. The electric generator of claim 1, wherein the first complementary magnetic poles are aligned in parallel with the main rotor axis.

3. The electric generator of claim 1, wherein the first complementary magnetic poles are aligned perpendicular with the main rotor axis.

4. The electric generator of claim 1, wherein a field of the first permanent magnet is directed by a plurality of laminations.

5. The electric generator of claim 4, wherein the plurality of laminations are three laminations.

6. The electric generator of claim 1, wherein the first and second permanent magnets are each formed of a single body.

7. The electric generator of claim 1, wherein the first complementary magnetic poles at the first end of the rotor are a mirror image of the second complementary magnetic poles at the second end of the rotor.

8. The electric motor of claim 1, wherein the wherein the first complementary magnetic poles at the first end of the rotor are oriented opposite to that of the second complementary magnetic poles at the second end of the rotor.

9. An electric generator comprising:

a stator core having a stator winding;

a rotor having a rotor winding, the rotor being positioned within the stator core and being freely rotatable on a main rotor axis;

a first permanent magnet being formed of a single body and having one or more first complementary magnetic poles coupled to one or more ends of the rotor, the a first field of the first permanent magnet being directed by three first laminations; and a second permanent magnet being formed of a single body and having one or more second complementary magnetic poles coupled to one or more ends of the rotor, a second field of the second permanent magnet being directed by three second laminations;

wherein the first complementary magnetic poles of the rotor are a mirror image of the second complementary magnetic poles; and wherein a permanent magnetic field is generated in the rotor from the first and second permanent magnets to induce an electromotive force in the stator winding upon rotation of the rotor at a frequency of 53 Hz.

* * * * *